(12) United States Patent
Katagiri et al.

(10) Patent No.: US 8,011,214 B2
(45) Date of Patent: Sep. 6, 2011

(54) VALET KEY STORAGE DEVICE

(75) Inventors: Toshiharu Katagiri, Aichi (JP); Yoshiyuki Seki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 256 days.

(21) Appl. No.: 12/203,021

(22) Filed: Sep. 2, 2008

(65) Prior Publication Data
US 2009/0064740 A1 Mar. 12, 2009

(30) Foreign Application Priority Data
Sep. 12, 2007 (JP) .................. 2007-236752

(51) Int. Cl.
*B60R 25/02* (2006.01)

(52) U.S. Cl. ............... 70/252; 70/387; 70/388; 70/389; 70/456 R

(58) Field of Classification Search .......... 70/252, 70/389, 429, 456 R, 459, 278.1, 278.2, 414, 70/387, 388, 390, 182–186; 206/37.1, 38.1, 206/37.5; 307/10.3–10.6; 340/5.72, 5.73
See application file for complete search history.

(56) References Cited

U.S. PATENT DOCUMENTS

| | | | |
|---|---|---|---|
| 3,552,160 A * | 1/1971 | Kleebauer | 70/388 |
| 3,708,032 A * | 1/1973 | Suzuki | 180/287 |
| 3,851,505 A * | 12/1974 | Wilkinson | 70/255 |
| 4,318,288 A * | 3/1982 | Rifat | 70/252 |
| 4,716,748 A * | 1/1988 | Watanuki et al. | 70/252 |
| 4,898,010 A * | 2/1990 | Futami et al. | 70/278.1 |
| 5,254,996 A * | 10/1993 | Claar et al. | 341/176 |
| 5,714,807 A * | 2/1998 | Albanes | 307/10.2 |
| 6,169,650 B1 * | 1/2001 | Albrecht | 361/171 |
| 6,546,768 B1 * | 4/2003 | Burghoff et al. | 70/252 |
| 6,756,698 B2 * | 6/2004 | Shamoto et al. | 307/10.6 |
| 6,776,016 B1 * | 8/2004 | Wittwer et al. | 70/252 |
| 7,392,675 B2 * | 7/2008 | Kito | 70/252 |
| 7,581,422 B2 * | 9/2009 | Schindler | 70/252 |
| 7,617,708 B2 * | 11/2009 | Frohne et al. | 70/252 |
| 2008/0100418 A1 * | 5/2008 | Stobbe et al. | 340/5.73 |
| 2009/0091421 A1 * | 4/2009 | Hirano | 340/5.7 |
| 2010/0071427 A1 * | 3/2010 | Tsuruta | 70/237 |

FOREIGN PATENT DOCUMENTS
JP 2006-225976 A 8/2006
* cited by examiner

*Primary Examiner* — LLoyd Gall
(74) *Attorney, Agent, or Firm* — Roberts Mlotkowski Safran & Cole, P.C.

(57) ABSTRACT

A valet key storage device, includes a valet key storage portion for storing a valet key having an opening, a locking bar for locking the valet key, a driving section for driving the locking bar to be inserted into the opening of the valet key, and a control section for controlling the driving section to insert the locking bar into the opening of the valet key or remove the locking bar therefrom.

10 Claims, 7 Drawing Sheets

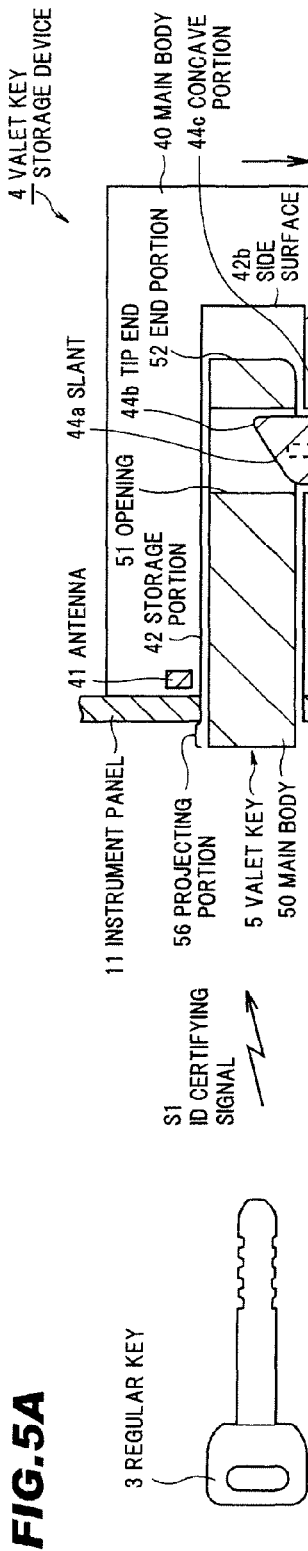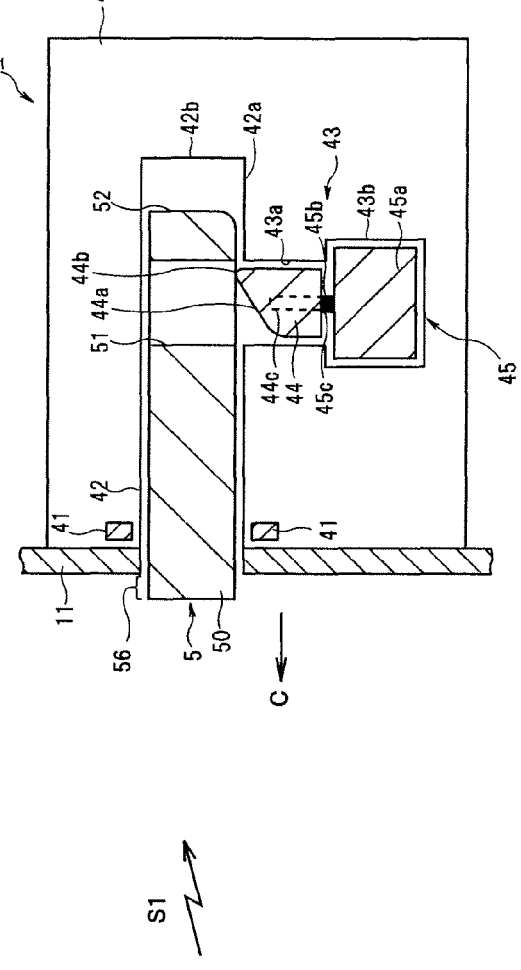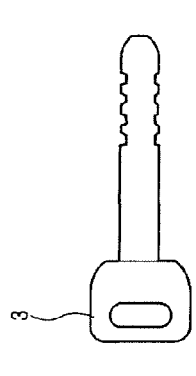

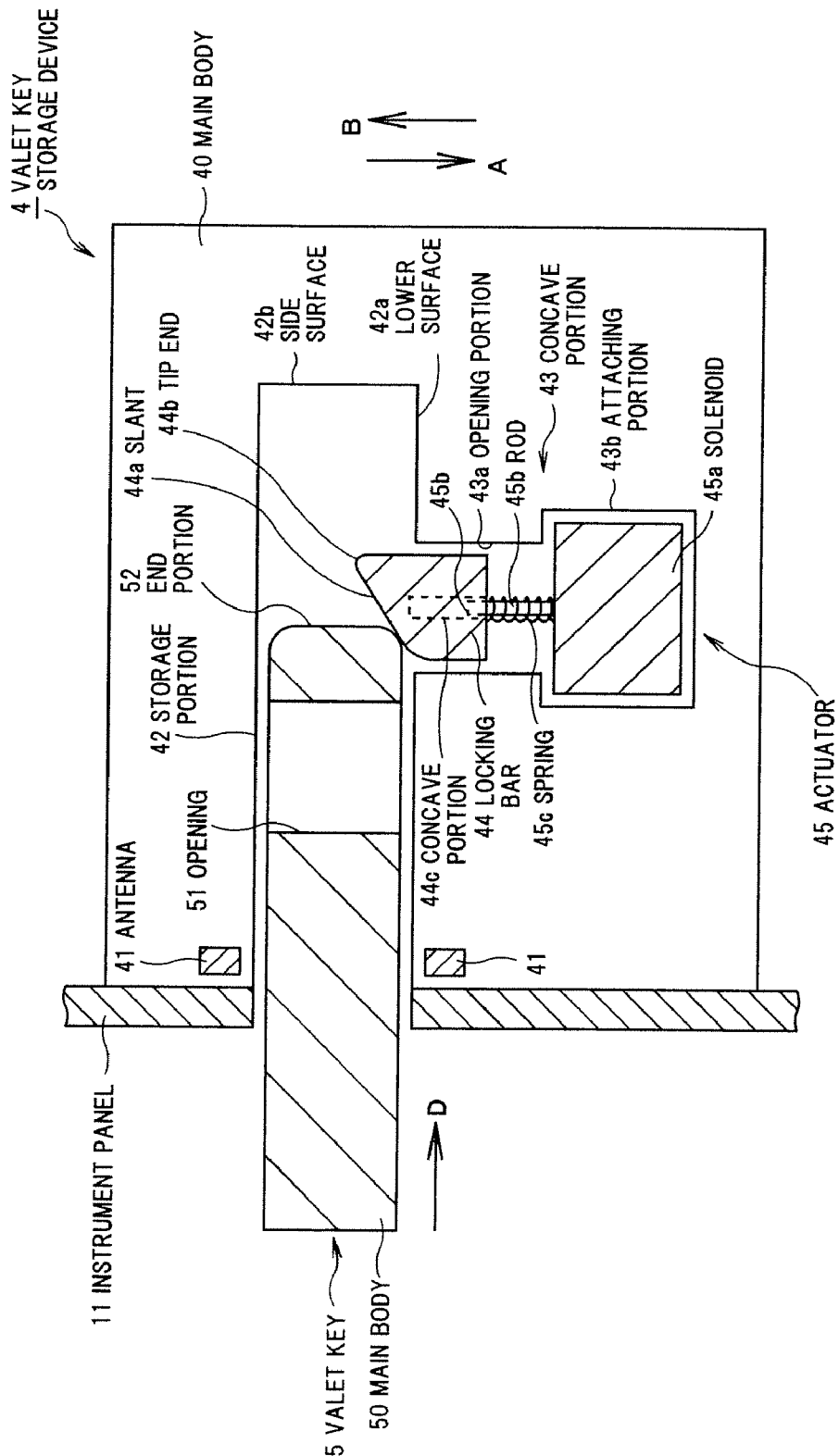

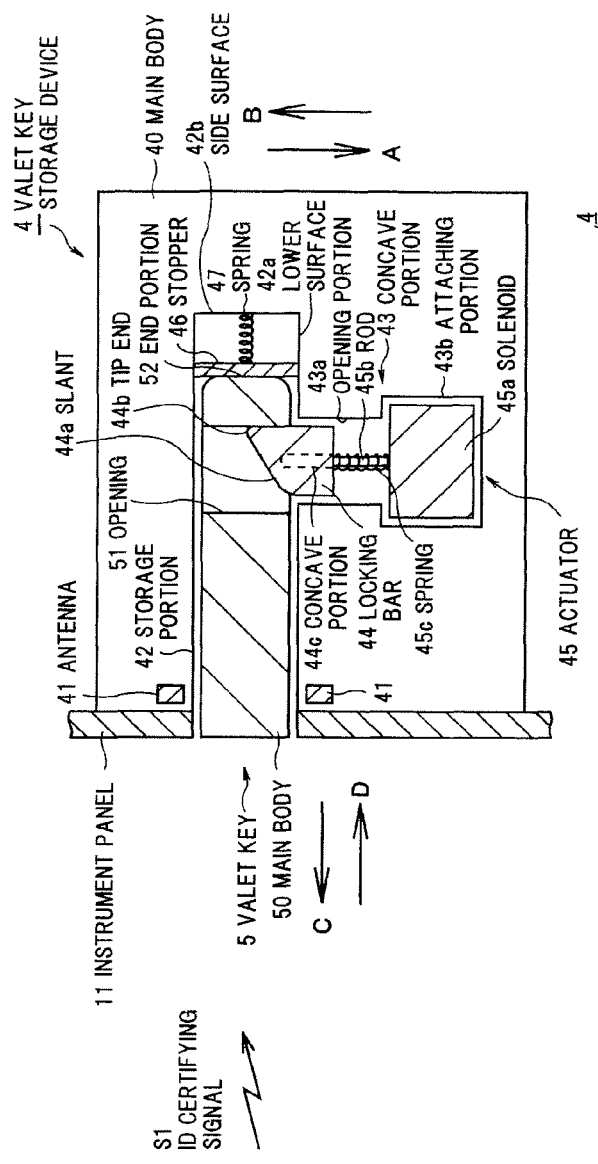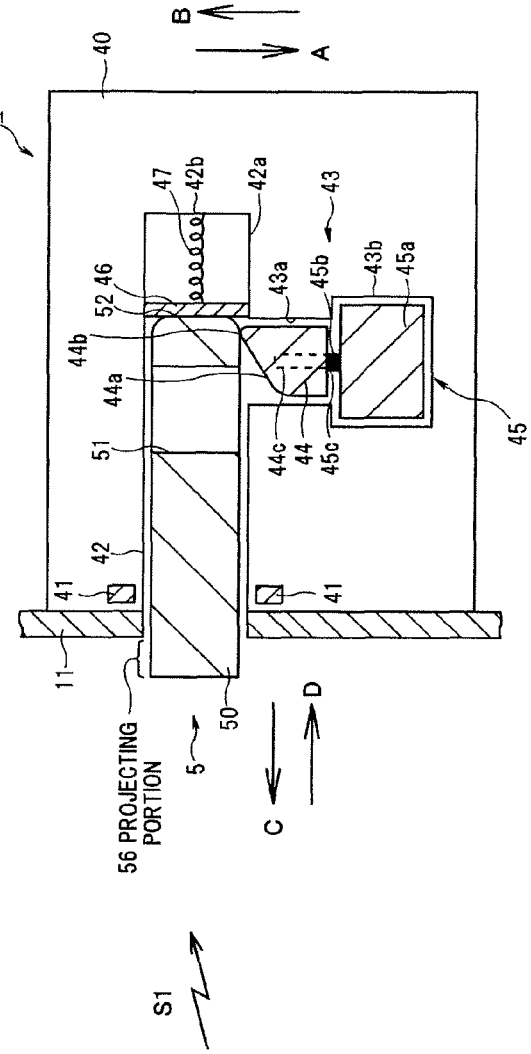

VALET KEY STORAGE DEVICE

The present application is based on Japanese Patent Application No. 2007-236752 filed on Sep. 12, 2007, the entire contents of which are incorporated herein by reference.

BACKGROUND OF THE INVENTION

1. Field of the Invention

The present invention relates to a valet key storage device in which a valet key can be securely stored in a vehicle.

2. Related Art

There are vehicle families which provide two kinds of key, one of which is a master key used by a driver for driving and another is a valet key. The valet key is used, for example, for depositing a vehicle by passing a key to a valet parking attendant of a hotel and entrusting him to move the vehicle to the parking etc. Both of the master key and the valet key can be used for unlocking or locking doors of the vehicle and starting up an engine. Furthermore, it is possible to unlock or lock a trunk or a glove box with the master key, but not with the valet key.

As for key types of a master key and a valet key, there is a key type with a key groove and key teeth which is inserted into a door and a cylinder of an engine start switch, and another key type having an immobilizing function in which the security against a theft or the like is enhanced by communicating with the engine start switch wirelessly.

A key having the immobilizing function is a system with an IC chip called a transponder incorporated in a key or a portable device, letting the transponder to transmit an ID code when bringing the key or the portable device close to an engine switch, permitting the engine to start up when the ID code of the transponder and an ID code on a vehicle side match, and starting up the engine by subsequently pressing a push button of the engine start switch.

A keyless system which activates a function of a valet key provided with the immobilizing function has been proposed, for example, there is a method for setting up a valet mode by an owner activating a mechanical lock of the vehicle with a mechanical key.

Furthermore, there is a smart keyless system disclosed by JP-A 2006-225976 in which it is not necessary to carry two of the master key and the valet key individually and also the security is enhanced, and in this system, a separating piece (tongue) incorporating a transponder in the portable device provided with a mechanical key is provided removably, a tongue isolation signal which indicates the separation of the tongue is transmitted with an ID signal from the portable device when passing the portable device to a valet parking attendant after detaching this tongue, and the valet mode is set up on the vehicle side.

However, according to a conventional smart keyless system, although it is possible to use the portable device separately for the master key and the valet key by attaching and removing the tongue, since the tongue is smaller compared with the portable device, it is possibly lost after separating from the portable device. In case of loss, a vehicle may be stolen by that key. Furthermore, the structure of the portable device becomes complicated. Furthermore, since there is no secure space to store a valet key in a conventional vehicle, it is necessary to carry around an extra key.

THE SUMMARY OF THE INVENTION

Therefore, it is an object of the invention to provide a valet key storage device by which a driver does not need to carry around an extra key and it is possible to store the valet key in the vehicle securely.

According to the present invention, a valet key storage device, comprises:
a valet key storage portion for storing a valet key having an opening;
a locking bar for locking the valet key;
a driving section for driving the locking bar to be inserted into the opening of the valet key; and
a control section for controlling the driving section to insert the locking bar into the opening of the valet key or remove the locking bar therefrom.

(1) The valet key storage portion is provided in a main body together with a concave portion for storing the locking bar, the concave portion being communicated with the valet key storage portion.

(2) The main body has an antenna which communicates with the valet key stored in the valet key storage portion.

(3) The valet key and the control section has an immobilizing function, and the control section communicates with the valet key stored in the valet key storage portion in a predetermined period based on the immobilizing function.

(4) The control section invalidates a function of the valet key when the valet key is removed from the valet key storage portion in a non-valet mode.

(5) The locking bar has a columnar shape with a slant formed at a tip end thereof and is forcedly moved into the concave portion by contact of the slant with the valet key.

(6) The driving section has a plunger rod connected with the locking bar at one end portion and drives the locking bar via the plunger rod.

(7) The plunger rod of the driving section is actuated by a solenoid.

(8) The valet key storage portion has a stopper supported by an elastic member on a bottom surface of the valet key storage portion, the elastic member being compressed by the stopper when the valet key is stored in the valet key storage portion, and the valet key being locked by the locking bar inserted in the opening of the valet key, while one end of the valet key is projected from the valet key storage portion in accordance with an elastic force of the elastic member when the valet key is unlocked.

(9) The control section shifts a valet key system into a valet mode when a valet switch is turned on to supply a valet switch-on signal to the control section, and an ID possessed by a regular key of a vehicle and an ID of the vehicle are certified by the immobilizing function.

According to the valet key storage device of the present invention, a driver does not need to carry around an extra valet key and it is possible to store the valet key in the vehicle securely.

BRIEF DESCRIPTION OF THE DRAWINGS

Next, the present invention will be explained in more detail in conjunction with appended drawings, wherein:

FIGS. 5A and 5B are cross sectional views of the valet key storage device in the first preferred embodiment according to the present invention, wherein FIG. 5A is before an ID certification and FIG. 5B is after the ID certification;

FIG. 6 is a cross sectional view of the valet key storage device in the first preferred embodiment according to the present invention when storing a valet key; and FIGS. 7A and 7B are cross sectional views of the valet key storage device in a second preferred embodiment according to the present invention, wherein FIG. 7A is before an ID certification and FIG. 7B is after the ID certification;

DESCRIPTION OF THE PREFERRED EMBODIMENTS

First Preferred Embodiment

A valet key storage device in the preferred embodiment according to the present invention will be explained in more detail in conjunction with the appended drawings.
(Structure of Vehicle 1)

Figure 1:
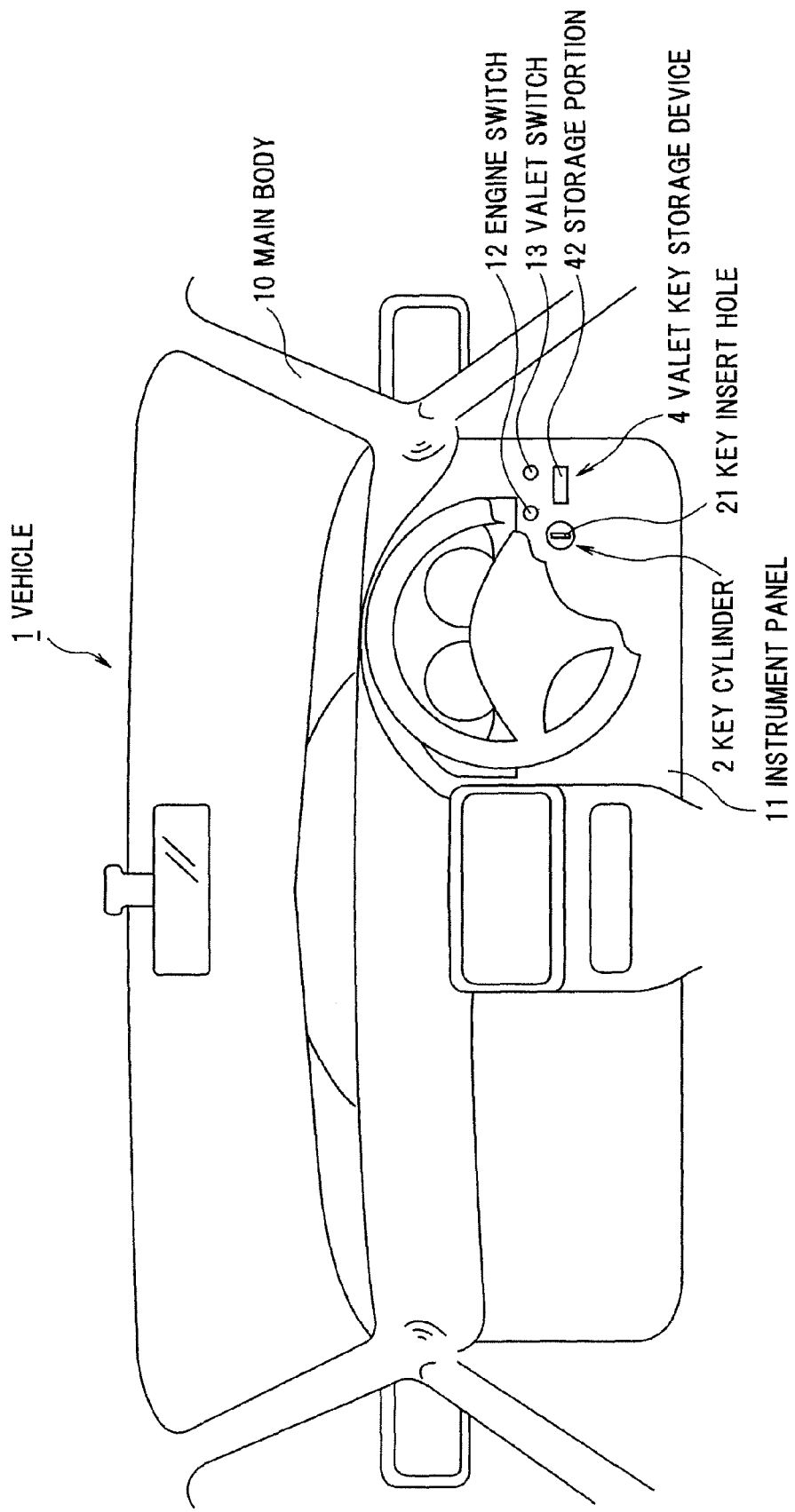
FIG. 1 is a schematic view of the inside of a vehicle in a first preferred embodiment according to the present invention.

FIG. 1 is a schematic view of the inside of a vehicle in a first preferred embodiment according to the present invention. As shown in FIG. 1, a vehicle 1 has a main body 10 mounting a below-described engine and a below-described ECU (Electronic Control Unit) as a control section and an instrument panel 11 to which various switches or the like are installed, where the instrument panel 11 is provided with a key cylinder 2, a valet key storage device 4 for storing a below-described valet key, an engine switch 12 and a valet switch 13. Since the ECU mounted on the vehicle 1 is provided with an immobilizing function, the vehicle 1 is configured not to allow an engine to be started up by only a mechanical key neither by an unauthorized operation of the key cylinder 2, such as picking or the like against the key cylinder 2.

In the engine switch 12, for example, the ECU certifies an ID (identification) stored in the ECU and an ID stored in a regular key which is wirelessly transmitted from a below-described regular key and received via an antenna of the vehicle 1, and when two IDs match, namely, after matching two IDs by an authentication operation by an immobilizing function, the engine can be started by pressing the engine switch 12.

For example, the valet switch 13 is a switch for turning on a valet mode which is used for depositing the vehicle 1 to a valet attendant of a hotel, and the valet mode is a mode which is set up by the ECU for controlling the vehicle 1 so that, for example, only startup/stop of the engine of the vehicle 1 and locking/unlocking of a door lock of the vehicle 1 are conducted by the valet key. ECU has a valet system, the valet system has the valet mode and a normal mode. The ID of the regular key and that of the vehicle 1 need to match for shifting to the valet mode, and when the ID is not certified, it is not possible to use the valet key even if the driver presses the valet switch 13. As for the mode of the vehicle 1 in the first preferred embodiment and the below-described second preferred embodiment, there is the normal mode besides a valet mode, and the normal mode is a mode in which it is possible to conduct all operations using a regular key, for example, locking and unlocking of a trunk, groove box or the like in the vehicle 1.

(Structure of the Valet Key Storage Device 4)

Figure 2:
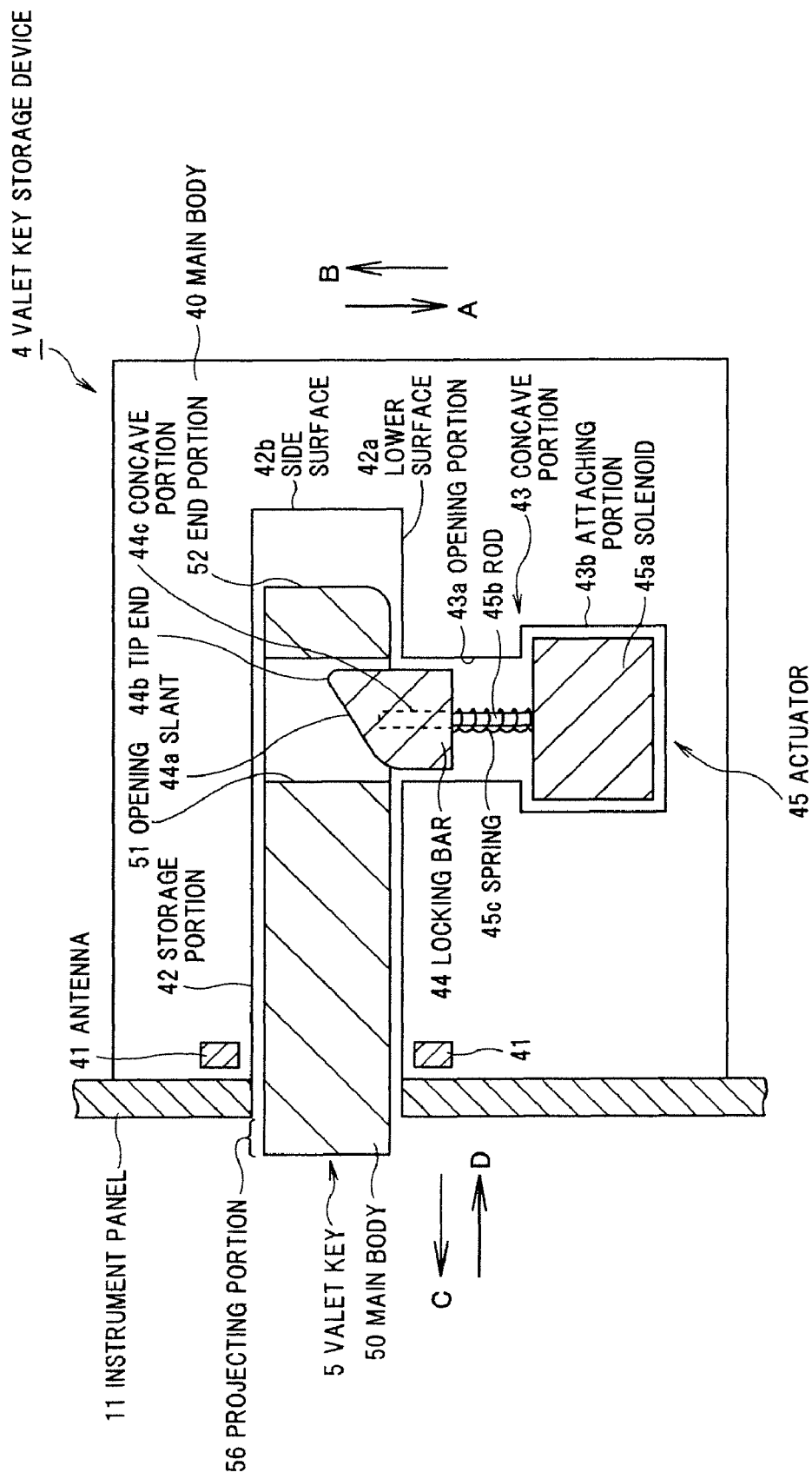
FIG. 2 is a cross sectional view of the valet key storage device in the first preferred embodiment according to the present invention.
Figure 3:
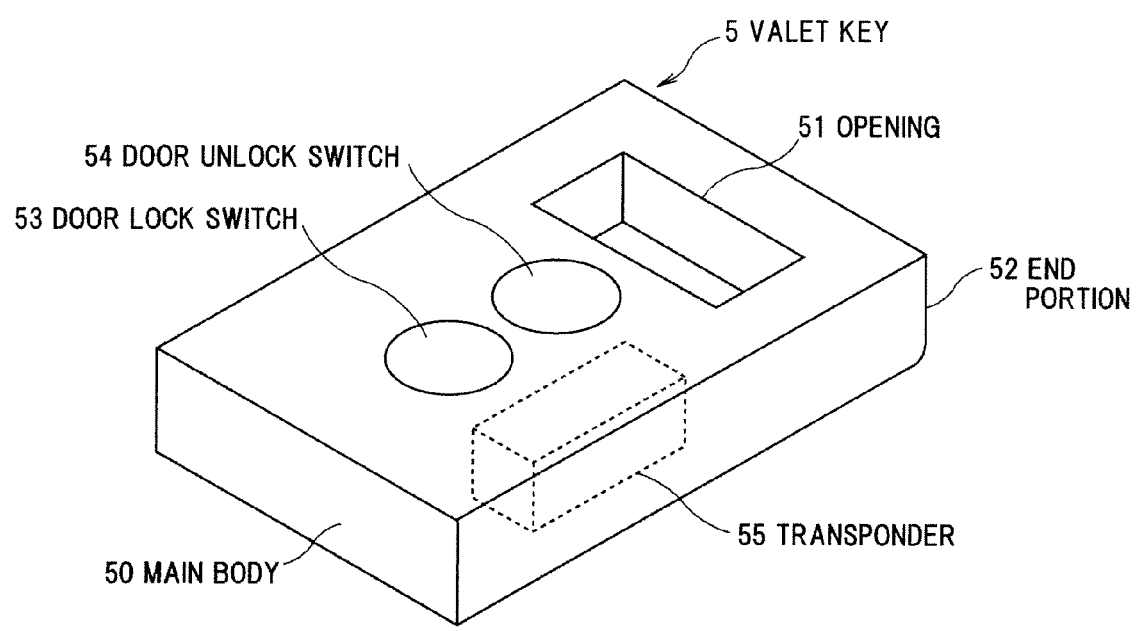
FIG. 3 is a perspective view of the valet key storage device in the first preferred embodiment according to the present invention.
Figure 4:
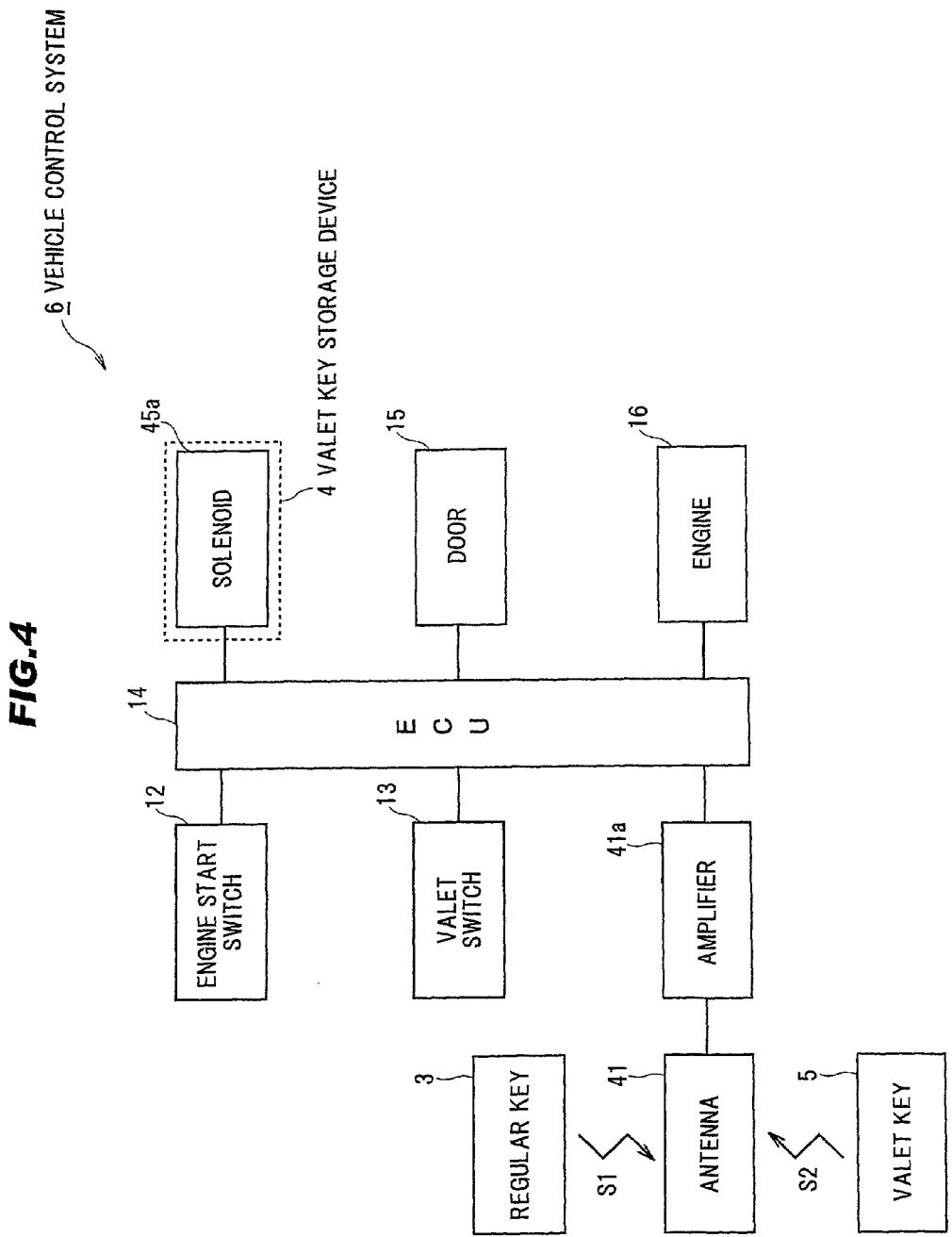
FIG. 4 is a block diagram of a vehicle control system in respect to the valet key storage device in the first preferred embodiment according to the present invention.

FIG. 2 is a cross sectional view of the valet key storage device in the first preferred embodiment according to the present invention, FIG. 3 is a perspective view of the valet key storage device in the first preferred embodiment according to the present invention and FIG. 4 is a block diagram of a vehicle control system in respect to the valet key storage device in the first preferred embodiment according to the present invention. A slashed portion of the valet key storage device 4 to a main body 40 is omitted below to facilitate visualization.

As shown in FIG. 2 and FIG. 4, the valet key storage device 4 is schematically configured to comprise an ECU 14, a storage portion 42 as a valet key storage portion, a locking bar 44 and an actuator 45 as a driving section for driving the locking bar 44.

Furthermore, as shown in FIG. 2, the valet key storage device 4 is schematically configured to comprise the main body 40 formed of a resin material or a metallic material in which the storage portion 42 and a concave portion 43 are formed, an antenna 41 provided near the storage portion 42 of the main body 40 for communicating with a regular key 3 and a valet key 5, and the concave portion 43 for storing the actuator 45. The concave portion 43 is communicated with the storage portion 42.

As shown in FIG. 2, for example, the storage portion 42 is in a rectangular shape and has a lower surface 42a which is a surface parallel to a direction to insert the valet key 5, namely, a direction indicated by an arrow D in shown FIG. 2 and a side surface 42b which is a surface vertical to the arrow D direction, furthermore, the concave portion 43 is provided on the lower surface 42a. The concave portion 43 is provided with an opening portion 43a in which the locking bar 44 can be displaced freely insertable to the storage portion 42 and an attaching portion 43b to which a below-described solenoid 45a is installed.

(Structure of the Locking Bar 44)

As shown in FIG. 2, the locking bar 44 has, for example, a columnar shape, formed of a resin material or a metallic material and is configured to comprise a slant 44a, a tip end 44b and a concave portion 44c. The slant 44a is provided for storing the valet key 5 in the storage portion 42 smoothly by contacting with an end portion 52 of the valet key 5 and converting a force in the arrow D direction into a force in an arrow A direction when storing the valet key 5 in the storage portion 42. Furthermore, the concave portion 44c is provided so that a rod 45b enters the concave portion 44c when storing the valet key 5 in the storage portion 42.

(Structure of the Actuator 45)

As shown in FIG. 2, the actuator 45 is schematically configured to comprise a solenoid 45a for driving the rod 45b using a non-illustrated magnetic body and a magnet coil, the rod(plunger rod) 45b is connected with the locking bar 44 at one end portion, and a spring 45c arranged around the rod 45b for applying an elastic force to the locking bar 44 in an arrow B direction. The rod 45b is configured to be stored inside the solenoid 45a when the solenoid 45a is driven in the arrow A direction and to be extended within the concave portion 44c when driven in the arrow B direction to store the valet key 5.

(Structure of the Valet Key 5)

As shown in FIG. 3, the valet key 5 is schematically configured to comprise a main body 50 mounting electronic components such as a non-illustrated battery, a transponder 55 or the like, an opening 51 formed on the main body 50 and allowing a key holder, accessories or the like to be connected, the end portion 52, a door lock switch 53 which is a button to lock a door of the vehicle 1 wirelessly, a door unlock switch 54 which is a button to unlock the door of the vehicle 1 wirelessly and the transponder 55 which communicates with a below-described ECU 14 via the antenna 41. Although the valet key 5 in this preferred embodiment is a portable device not having a mechanical key, it may be a key type having a mechanical key, and it is not limited thereto.

It is not necessary to process the opening 51 of the valet key 5 specifically, an opening provided in a conventional key may be diverted for use, in addition, it may be a concave portion not penetrating through the main body 50 to which the locking bar 44 is freely insertable, furthermore, it may be a configuration that the locking bar 44 enters the opening or the concave portion provided on the side surface of the valet key 5 and is coupled therewith, and it is not limited thereto.

The transponder 55 is schematically configured to comprise a non-illustrated CPU (Central Processing Unit), a power supply circuit, a detector circuit, a memory unit to store an ID or the like. Furthermore, the transponder 55 communicates with the ECU 14 via the antenna 41 of the valet key storage device 4 in a predetermined period, and based on this communication, the ECU 14 verifies whether or not the valet key 5 is stored in the valet key storage device 4. For example, when the communication between the ECU 14 and the valet key 5 becomes impossible even though the mode is not shifted to the valet mode, namely, when the valet key 5 is taken out from the valet key storage device 4 illegally, the ECU 14 controls the vehicle 1 so as not to accept any operations by the valet key 5, namely, so as to invalidate the function of the valet key 5. In other words, the ECU 14 invalidates a function of the valet key 5 when the valet key 5 is removed from the storage portion 42 in a non-valet mode.

(Structure of Vehicle Control System 6)

As shown in FIG. 4, a vehicle control system 6 is schematically configured to comprise the regular key 3 having a button, a transponder and a mechanical key or the like which enable the locking or the unlocking of the door and allowing all operations using a key to the vehicle 1 to be conducted, the solenoid 45a of the valet key storage device 4, the valet key 5, the engine switch 12, the valet switch 13, the ECU 14, a door 15, an engine 16, the antenna 41 and an amplifier 41a to amplify an electric wave received by the antenna 41.

The ECU 14 has an immobilizing function and is schematically configured to comprise a non-illustrated CPU, a power supply circuit, an ID authentication circuit, a memory unit to store an ID, or the like. When an ID certifying signal S1 of the regular key 3 received via the antenna 41 and the amplifier 41a matches the ID of the vehicle 1, the ECU 14 sets up the mode of the vehicle 1 to be a normal mode and permits the startup of the engine 16 or the like. Following this, when the valet switch 13 is pressed, the ECU 14 sets up the mode of the vehicle 1 to be a valet mode and controls the startup/stop of the engine 16 and locking/unlocking of the door 15 of the vehicle 1 based on a signal transmitted from the engine switch 12 and an operational signal S2 from the valet key 5. The operational signal S2 includes the ID of the valet key 5.

(Operation of the First Preferred Embodiment)

Operation of the valet key storage device 4 in the first preferred embodiment will be explained in more detail in conjunction with each drawing.

FIGS. 5A and 5B are cross sectional views of the valet key storage device in the first preferred embodiment according to the present invention, wherein FIG. 5A is before an ID certification and FIG. 5B is after the ID certification, and FIG. 6 is a cross sectional view of the valet key storage device in the first preferred embodiment according to the present invention when storing a valet key.

(Ejecting Operation of the Valet Key 5)

When a driver gets into the vehicle 1 with the regular key 3, the antenna 41 receives the ID certifying signal S1 transmitted from the regular key 3 and the ECU 14 which receives the ID certifying signal S1 via the antenna 41 and the amplifier 41a certifies the ID of the regular key 3 and the ID of the vehicle 1.

When the ID of the regular key 3 matches the ID of the vehicle 1, the ECU 14 shifts a mode to the normal mode in which it is possible to start up or stop the engine 16 of the vehicle 1. When the driver presses the engine switch 12 shown in FIG. 1, the ECU 14 starts the engine 16 controlling a non-illustrated ignition system. When the vehicle 1 is in the normal mode, ECU 14 may drive the locking bar 44 via the solenoid 45a and the rod 45b, and release the lock of the valet key 5.

After driving the vehicle 1 in the normal mode, as an example, the driver arrives at a hotel which is a destination and presses the valet switch 13 shown in FIG. 1 after stopping the engine 16 for depositing the vehicle 1 to a valet attendance of the hotel.

Since the ID of the regular key 3 matches the ID of the vehicle 1, the ECU 14, which received a signal from the valet switch 13 for shifting to the valet mode, shifts the mode of the vehicle 1 to the valet key system into the valet mode, furthermore, controls the actuator 45 of the valet key storage device 4 and displaces the locking bar 44 in the arrow A direction shown in FIG. 5A until the locking bar 44 comes out from the opening 51 of the valet key 5. In the first preferred embodiment and the below-described second preferred embodiment, the ECU 14 controls the actuator 45 and displaces the locking bar 44 in the arrow B direction as shown in FIG. 6, when the valet key 5 is taken out from the valet key storage device 4 and the vehicle 1 is operated, however, it is not limited thereto, it may be displaced in the arrow B direction after the valet key 5 is inserted into the storage portion 42 of the valet key storage device 4, and it is not limited thereto, neither.

The driver pulls out the valet key 5 in an arrow C direction shown in FIG. 5B holding a projecting portion 56 of the valet key 5 shown in FIG. 2 by hand, and passes the valet key 5 to the valet attendant.

After receiving the valet key 5 from the driver, the valet attendant gets into the vehicle 1 and presses the engine switch 12. Since the mode has been already shifted to the valet mode, the ECU 14 starts the engine 16 controlling the non-illustrated ignition system. The valet attendant drives the vehicle 1 and stops it at a predetermined space, then, the valet attendant stops the engine 16 by pushing down the engine switch 12 and pushes down the door lock switch 53 of the valet key 5 after getting off the vehicle. The valet key 5 transmits the operational signal S2 to the vehicle 1 and the ECU 14 locks the door 15 of the vehicle 1. Since the valet key 5 communicates with the ECU 14 via the antenna 41 and the amplifier 41a in the predetermined period, it is not possible to start the engine 16 unless the valet key 5 is located at a position where the communication with the ECU 14 is possible.

(Store Operation of the Valet Key 5)

The driver receives the valet key 5 from the valet attendant for driving the vehicle 1, gets into the vehicle 1 unlocking the door 15 by the regular key 3 or the valet key 5 and inserts the valet key 5 into the storage portion 42 of the valet key storage device 4 in the arrow D direction shown in FIG. 6 from the end portion 52.

At this time, as shown in FIG. 6, the end portion 52 of the valet key 5 contacts with the slant 44a of the locking bar 44, the locking bar 44 is pushed in the arrow A direction and the rod 45b is extended in the concave portion 44c therewith. Furthermore, the locking bar 44 burrows into the lower surface of the valet key 5 shrinking the spring 45c. When further pushing the valet key 5 in the arrow D direction, since the elastic force is applied to the locking bar 44 in the arrow B direction by the spring 45c, the tip end 44b of the locking bar 44 enters the opening 51 and the locking bar 44 enters further into the opening 51 by further pushing the valet key 5 as shown in FIG. 2. Even if trying to pull out the valet key 5 in the arrow C direction holding the projecting portion 56 of the valet key 5 in this state, the opening 51 of the valet key 5 does not contact with the slant 44a of the locking bar 44 but does contact with a surface of the locking bar 44 vertical to the arrow C direction. Thus, it is not possible to pull out the valet key 5.

Following this, the valet mode is released by an operation of the driver, shifting to the normal mode. As described above, the operation by the valet key 5 is invalidated even if the valet key 5 can be pulled out in the normal mode.

(Effect of the First Preferred Embodiment)

(1) According to the above-mentioned first preferred embodiment, since it is possible to store the valet key 5 in the vehicle 1 securely, the driver does not need to carry around an extra valet key 5.

(2) According to the above-mentioned first preferred embodiment, since the valet key 5 has the immobilizing function, it is possible to communicate with the vehicle 1 in the state that the valet key 5 is stored in the valet key storage device 4.

(3) According to the above-mentioned first preferred embodiment, it is possible to verify whether or not the valet key 5 is stored in the valet key storage device 4 by communicating with the valet key 5 in the predetermined period using the immobilizing function.

(4) According to the above-mentioned first preferred embodiment, since the valet key storage device 4 has the antenna 41 adjacent to the storage portion 42, it is possible to certainly communicate with the stored valet key 5.

(5) According to the above-mentioned first preferred embodiment, since the immobilizing function is used for the communication with the valet key 5, it is possible to invalidate the function of the valet key 5 based on the unauthorized withdrawal of the valet key 5 from the valet key storage device 4.

(6) According to the above-mentioned first preferred embodiment, since the locking bar 44 has the slant 44a, it is possible to insert the valet key 5 into the storage portion 42 smoothly.

(7) According to the above-mentioned first preferred embodiment, it is easy to control since the solenoid 45a is used as the driving section.

(8) According to the above-mentioned first preferred embodiment, since the locking bar 44 is driven by the solenoid 45a via the rod 45b, the structure is simple and it is easy to downsize.

(9) According to the above-mentioned first preferred embodiment, since the valet key 5 can be taken out from the valet key storage device 4 after realizing the certification of the ID of the regular key 3 and that of the vehicle 1, it is possible to prevent the unauthorized withdrawal.

Second Preferred Embodiment

A valet key storage device in the second preferred embodiment according to the present invention will be explained in more detail in conjunction with each drawing. The explanation for the portions which have the same structures and functions as the first preferred embodiment will be omitted by referring the mutual numbers in the following explanation.

(Structure of the Valet Key Storage Device 4)

FIGS. 7A and 7B are cross sectional views of the valet key storage device in a second preferred embodiment according to the present invention, wherein FIG. 7A is before an ID certification and FIG. 7B is after the ID certification.

In the valet key storage device 4 in this preferred embodiment, a stopper 46 and a spring (an elastic member) 47 are newly provided compared with that of the first preferred embodiment.

The stopper 46 is a plate-like member having a rectangular shape conformed to the shape of the storage portion 42, in which the spring 47 shown in FIG. 7A is provided between a surface faced to the surface contacting with the end portion 52 of the valet key 5 and the side surface (bottom surface) 42b. The spring 47 applies an elastic force to the stopper 46 in the arrow C direction.

(Ejecting Operation of the Valet Key 5)

When the driver presses the valet switch 13 shown in FIG. 1 for passing the valet key 5 to the valet attendant, since the ID of the regular key 3 matches the ID of the vehicle 1, the ECU 14, which received a signal from the valet switch 13 for shifting to the valet mode, shifts the mode of the vehicle 1 to the valet mode, furthermore, controls the actuator 45 of the valet key storage device 4 and displaces the locking bar 44 in the arrow A direction shown in FIG. 7A until the locking bar 44 comes out from the opening 51, namely, until the locking by the locking bar 44 is released.

Since the elastic force is applied by the spring 47 in the arrow C direction, the valet key 5 is slightly pushed out from the storage portion 42 when the locking bar 44 comes out from the opening 51.

The driver pulls out the valet key 5 holding the projecting portion 56 of the valet key 5 by hand, and then, passes it to the valet attendant.

(Store Operation of the Valet Key 5)

The driver receives the valet key 5 from the valet attendant for driving the vehicle 1, gets into the vehicle 1 unlocking the door 15 by the regular key 3 or the valet key 5 and inserts the valet key 5 into the storage portion 42 of the valet key storage device 4 in the arrow D direction shown in FIG. 7B from the end portion 52.

At this time, similar to the store operation of the first preferred embodiment, the end portion 52 of the valet key 5 contacts with the slant 44a of the locking bar 44, the locking bar 44 is pushed in the arrow A direction and the rod 45b is stored in the concave portion 44c therewith. Furthermore, the locking bar 44 burrows into the lower surface of the valet key 5 shrinking the spring 45c. When the driver further pushes the valet key 5 in the arrow D direction, the end portion 52 of the valet key 5 contacts with the stopper 46, by which the spring 47 shrinks in the arrow D direction.

Following this, since the elastic force is applied to the locking bar 44 in the arrow B direction by the spring 45c, the tip end 44b of the locking bar 44 enters the opening 51 and the locking bar 44 enters the opening 51 by further pushing the valet key 5 as shown in FIG. 7A. At this time, since the valet key 5 is completely stored in the valet key storage device 4, it becomes difficult to take out the valet key 5 in the stored state, thus, it is possible to store the valet key 5 in the vehicle 1 more securely.

(Effect)

(1) According to the above-mentioned second preferred embodiment, since the valet key 5 is completely stored in the storage portion 42, it is difficult to pull out the valet key 5 from the valet key storage device 4 when not being in the valet mode, thus, it is possible to store the valet key 5 in the vehicle 1 more securely.

(2) According to the above-mentioned second preferred embodiment, since the valet key 5 is completely stored in the storage portion 42, the design is excellent.

(3) According to the above-mentioned second preferred embodiment, since the elastic force of the spring 47 is transmitted to the valet key 5 via the stopper 46 and the valet key 5 stored in the storage portion 42 is pushed out when the locking by the locking bar 44 is released, it becomes easy to take out the valet key 5 from the storage portion 42.

It should be noted that the present invention is not intended to be limited to the above-mentioned embodiments, and the various kind of changes thereof can be implemented without departing from the gist of the invention.

What is claimed is:

1. A valet key storage system integrated within an automotive vehicle having an engine capable of being started by an engine switch, comprising:
    a regular key for unlocking doors of the vehicle and starting the vehicle engine;
    a valet key for unlocking doors of the vehicle and starting the vehicle engine, the valet key having an opening;
    a valet key storage portion located in the body of the vehicle for storing the valet key;
    an electronic control unit (ECU) including a control section that activates the engine switch from an operative state that does not allow the switch to start up the vehicle engine to an inoperative state that does allow the switch to start up the vehicle engine;
    a locking bar for locking the valet key in the valet key storage portion;
    a driving section for driving the locking bar into insertion with the opening of the valet key to lock the valet key in the storage portion and for removing the locking bar from insertion to unlock the valet key from the storage portion; and
    the control section controlling the driving section to insert the locking bar into the opening of the valet key or remove the locking bar therefrom upon the actuation of a valet switch,
    wherein both the regular key and the valet key include a transponder that communicates with the ECU to activate the engine switch.

2. The valet key storage system, according to claim 1, wherein:
    the valet key storage portion is provided in a main body of the vehicle together with a concave portion for storing the locking bar, the concave portion communicating with the valet key storage portion.

3. The valet key storage system, according to claim 2, wherein:
    the main body has an antenna which communicates with the valet key stored in the valet key storage portion.

4. The valet key storage system, according to claim 1, wherein:
    the valet key and the control section have an immobilizing function, and the control section communicates with the valet key stored in the valet key storage portion in a predetermined period based on the immobilizing function.

5. The valet key storage system, according to claim 1, wherein:
    the control section invalidates the ability of the valet key to start and unlock the vehicle when the valet key is removed from the valet key storage portion in a non-valet mode.

6. The valet key storage system, according to claim 1, wherein:
    the locking bar has a columnar shape with a slant formed at a tip end thereof and is forcefully moved into a concave portion by contact of the slant with the valet key.

7. The valet key storage system, according to claim 1, wherein:
    the driving section has a plunger rod connected with the locking bar at one end portion that drives the locking bar via an elastic force applied by an elastic member.

8. The valet key storage system, according to claim 7 further comprising a solenoid, wherein:
    the plunger rod of the driving section is withdrawn against the force applied by the elastic member and released by the solenoid.

9. The valet key storage system, according to claim 3, wherein:
    the valet key storage portion has a stopper supported by an elastic member on a bottom surface of the valet key storage portion, the elastic member being compressed by the stopper when the valet key is stored in the valet key storage portion, and the valet key being locked by the locking bar inserted in the opening of the valet key, while one end of the valet key is projected from the valet key storage portion in accordance with an elastic force of the elastic member when the valet key is unlocked.

10. The valet key storage system, according to claim 3, wherein:
    the control section shifts the valet key storage system into a valet mode when the valet switch is turned on to supply a valet switch-on signal to the control section, and an ID possessed by the regular key of the vehicle and an ID of the vehicle are certified by an immobilizing function of the control section.

* * * * *